(12) United States Patent
Saitou et al.

(10) Patent No.: US 6,767,648 B2
(45) Date of Patent: Jul. 27, 2004

(54) COPPER-BASED, SINTERED SLIDING MATERIAL AND METHOD OF PRODUCING SAME

(75) Inventors: Yasushi Saitou, Nagoya (JP); Eisaku Inoue, Nagoya (JP); Masahito Fujita, Nagoya (JP); Takayuki Shibayama, Nagoya (JP)

(73) Assignee: Daido Metal Company Ltd., Nagoya (JP)

( * ) Notice: Subject to any disclaimer, the term of this patent is extended or adjusted under 35 U.S.C. 154(b) by 0 days.

(21) Appl. No.: 10/281,298

(22) Filed: Oct. 28, 2002

(65) Prior Publication Data

US 2003/0064239 A1 Apr. 3, 2003

(30) Foreign Application Priority Data

Dec. 27, 2001 (JP) .......................... 2001-397444

(51) Int. Cl.⁷ ................ B32B 7/02; B32B 15/18; B32B 15/20
(52) U.S. Cl. ................ 428/548; 428/553; 428/564; 428/677; 384/912
(58) Field of Search ............... 428/548, 504, 428/553, 675, 677, 684; 384/912; 419/8, 10, 29, 54

(56) References Cited

U.S. PATENT DOCUMENTS

| 5,424,138 | A | * | 6/1995 | Tanaka et al. | 428/553 |
| 5,482,782 | A | * | 1/1996 | Tanaka et al. | 428/553 |
| 5,911,513 | A | * | 6/1999 | Tsuji et al. | 384/276 |
| 6,163,961 | A | * | 12/2000 | McMeekin | 29/898.056 |
| 6,475,635 | B1 | * | 11/2002 | Sakai et al. | 428/553 |
| 6,613,121 | B2 | * | 9/2003 | Takayama et al. | 75/247 |
| 6,652,675 | B2 | * | 11/2003 | Sakai et al. | 148/433 |

* cited by examiner

*Primary Examiner*—Deborah Jones
*Assistant Examiner*—Jason L Savage
(74) *Attorney, Agent, or Firm*—Browdy and Neimark, P.L.L.C.

(57) ABSTRACT

There are provided a copper-based sintered sliding material comprising a steel back metal layer, and a sintered layer made of Cu or a Cu-based alloy which is bonded onto the steel back metal layer, the steel back metal layer having a hardness not less than 160 Hv and an elongation not less than 10%, the sintered layer having a hardness not more than 130 Hv and crystal grains each provided with a grain size not more than 45 $\mu$m, a method of producing the sliding material, and a sliding bearing formed of the sliding material.

20 Claims, 6 Drawing Sheets

US 6,767,648 B2

COPPER-BASED, SINTERED SLIDING MATERIAL AND METHOD OF PRODUCING SAME

BACKGROUND OF THE INVENTION

The present invention relates to a copper-based, sintered sliding material provided with a steel back metal layer, particularly a copper-based, sintered sliding material in which the strength of the steel back metal layer and the bearing characteristics of a sintered layer are enhanced, and relates to a method of producing the same.

In prior arts, a conventional copper-based, sintered sliding material has been, in general, produced by a method comprising the steps of: spreading a Cu-based alloy powder on a steel back metal; performing the primary sintering of them in a reducing atmosphere at a temperature of 800 to 950° C. for about 15 minutes; performing the primary rolling thereof so that a sintered layer may be compacted; performing the secondary sintering thereof under the same conditions as those of the primary sintering; and performing the secondary rolling thereof for the purposes of improving the strength and of adjusting the size thereof. Since this method is suitable for the mass production thereof and makes it possible to produce the sliding material at a low cost, the sliding material has been used to produce bearings used in the industries of a broad range.

Nowadays, there are such a tendency as a housing for mounting a bearing is made of a light alloy such as an aluminum alloy so as to meet the requirement of the light-weight-and-small-size design of a bearing device, and such another tendency as the bearing itself is made to have a thin thickness and a narrowed width for obtaining a low friction. On the other hand, the degree of fixing the bearing onto the housing depends on an interference (i.e. crush height), and it is necessary for the interference to have such a value as a radial stress applied onto the bearing is more than a predetermined level so as to prevent the bearing from being displaced in the housing while another stress occurring in the circumferential direction of the bearing due to the interference is not more than the yield point of the bearing (the steel back metal) so that the bearing may be prevented from being buckled.

SUMMARY OF THE INVENTION

However, as is often the case with a bearing device used in an internal combustion engine for a vehicle, there is such a case as the temperature range of the use of the bearing device is very large, for example, from a below-zero temperature (at the time of non-driving) to about 200° C. (during driving). The inventors of the invention have found that, in this case, since the difference in thermal expansion between the housing made of the light alloy and the bearing becomes large, it is necessary to make the interference large so that the fixing of the bearing may not be loosened even at the high temperature. In the case of making the interference large, there occurs such a fear as, in a bearing having a thin thickness or having a narrow width, the circumferential stress becomes so large that the buckling thereof is caused. Once the buckling occurs, a clearance between a shaft and the bearing is decreased with the result that the seizure thereof is apt to occur, and/or the radial stress applied thereto is decreased with the result that the bearing comes to rotate together with the shaft or that the bearing comes to be separated from the housing or that fretting occurs between the inner face of the housing and the back face of the bearing. On the other hand, the inventors of the invention have also found that, in another case of making the interference small, the radial stress applied to the bearing becomes so small that the above problem such as the rotation of both of the bearing and shaft or the separation of the bearing or the fretting etc. occurs similarly to the case of the buckling.

In order to enhance the buckling resistance of the bearing by increasing the strength of the steel back metal layer, it is thought to make the rolling reduction of a secondary rolling large so that the strength of the steel back metal layer may be raised because of the work hardening thereof. However, in the case of making the rolling reduction large, each of the steel back metal layer and the sintered layer made of Cu or Cu alloy becomes hard in hardness and brittle, so that the bearing comes to crack during the press working applied thereto or becomes inferior in workability. Further, in this case, the sliding performances such as conformability and foreign matter embeddability etc. are deteriorated due to the hardening of the Cu or Cu alloy of which the sintered layer is made, so that the seizure thereof is apt to occur. In addition, the sliding material is subjected to a deformation during the secondary rolling, so that the metal grains thereof come to have much strain. In general, a metal material with strained grains causes a recovery phenomenon even at a temperature less than the recrystallization temperature thereof, so that the strain is relieved although the complete release thereof does not occur. Thus, in a bearing used in an internal combustion engine in which the temperature is raised up to about 200° C., the recovery phenomenon is caused during the use thereof, due to which the circumferential length of the bearing is varied (reduced) when the strain put in the crystal grains at the secondary rolling is relieved, even at such a level of the interference as no buckling occurs at the time when the bearing is initially mounted in the housing so that the same problem as in the case where the bearing is buckled is caused. This problem occurs not only in the housing made of the light metal such as Al alloy but also in the housing made of a steel or a cast steel.

The invention is made in taking the above-explained circumstances of the prior art into consideration, and the first object of the invention is to provide a copper-based, sintered sliding material superior in sliding characteristics and workability in which the amount of decrease in the circumferential length of a bearing made of this sliding material is small when the bearing mounted in a housing is subjected to the use temperature thereof and which can keep a high yield point. The second object of the invention is to provide a method of producing the copper-based, sintered sliding material at a low cost.

According to the first aspect of the invention, there is provided a copper-based, sintered sliding material comprising a steel back metal layer and a sintered layer made of Cu or a Cu alloy which is bonded onto the steel back metal layer, the steel back metal layer having a hardness not less than 160 Hv and an elongation not less than 10%, the sintered layer having a hardness not more than 130 Hv and a grain size not more than 45 μm.

In this copper-based, sintered sliding material having the above constitution, the sintered layer made of Cu or the Cu alloy has such a relatively soft structure as to be not more than 130 Hv in hardness, so that the sliding characteristics such as conformability and foreign matter embeddability are superior. Further, since the grain size of the Cu or Cu alloy is not more than 45 μm, the sintered layer has a fine structure, so that the strength thereof becomes high although it is soft, with the result that the sintered layer becomes superior in fatigue resistance. The grain size used herein is measured in accordance with the method for estimating average grain size for wrought copper and copper alloy products which is defined in JIS H 0501.

On the other hand, since the steel back metal layer has the elongation not less than 10%, the strain in the crystal grains thereof is at a low level. Further, since the steel back metal layer has the hardness not less than 160 Hv, the yield point thereof becomes high, and the steel back metal layer can withstand a large circumferential stress when the sliding material is formed into a cylindrical bearing, so that no fear of the buckling of the bearing is caused. In addition, the steel back metal layer is previously subjected to a heat treatment for bringing about the recovery phenomenon thereof, there occurs no fear of decrease in the circumferential length of the bearing which is caused due to the relieving of the strains in the crystal grains during the recovery phenomenon. Further, since the sintered layer is soft with the elongation of the steel back metal layer being not less than 10%, the cracks of the sliding material hardly occurs even in the case where an impact force is applied thereto in the press working thereof, that is, the sliding material is superior in workability.

In the sintered layer, Sn (tin) of 1 to 11 mass % may be contained. Further, the sintered layer may contain P (phosphorus) not more than 0.2 mass %, or may contain Ni (nickel) and/or Ag (silver) not more than 10 mass % in total, or may contain Pb (lead) and/or Bi (bismuth) not more than 25 mass % in total.

The sintered layer may contain dispersed hard particles and/or the dispersed particles of a high melting point substance of not more than 15 volume % in total, or may contain a dispersed solid lubricant not more than 10 volume %. Further, on the surface of the sintered layer, a plating overlay layer may be provided which is made of a Pb—Sn alloy containing In and/or Cu.

The reasons for containing the above components are explained below.

(a) Sn: 1 to 11 mass %

Sn acts to enhance the strength of the Cu matrix, and acts, in the production method explained below, to lower the recrystallization temperature of the Cu alloy constituting the sintered layer and to enlarge a heat treatment temperature range (which is defined to be not less than the recrystallization-commencement temperature of Cu or the Cu alloy but less than the recrystallization-commencement temperature of the steel back metal layer). No effect is brought about in a case of the amount of Sn being less than 1 mass %, and the Cu alloy becomes brittle in another case of the amount of Cu being more than 11 mass %.

(b) P: not more than 0.2 mass %

P acts to enhance the strength of the Cu matrix. In the case where the amount of P exceeds 0.2 mass %, the sintered layer becomes too hard in hardness.

(c) Pb and/or Bi: not more than 25 mass % in total

Each of Pb and Bi acts to enhance the conformability of the Cu matrix. In the case where the amount of Pb and/or Bi exceeds 25 mass % in total, the sintered layer becomes brittle.

(d) Ni and/or Ag: not more than 10 mass % in total

Each of Ni and Ag acts to enhance the strength and corrosion resistance of the Cu matrix. In the case where the amount of Ni and/or Ag exceeds 10 mass % in total, the sintered layer becomes brittle.

(e) The hard particles and/or the particles of the high melting point substance: being dispersed by the amount not more than 15 volume % in total The hard particles and/or the particles of the high melting point substance act to enhance the sliding characteristics of the sintered layer, the wear resistance thereof and the anti-seizure property thereof. In the case where the amount thereof exceeds 15 volume % in total, the sintered layer becomes brittle. The hard particles are ones of at least one kind selected from the group consisting of a metal oxide, a metal carbide, a metal silicide, and an intermetallic compound. The particles of the high melting point substance are ones of at least one kind selected from the group consisting of Mo (molybdenum), W (tungsten) and C (carbon).

(f) The solid lubricant: being dispersed by the amount not more than 10 volume %

The solid lubricant acts to enhance the lubrication of the sintered layer, however, it make the sintered layer brittle in the case where the amount of the solid lubricant exceeds 10 volume %. The solid lubricant is at least one kind selected from the group consisting of $MoS_2$, $WS_2$, BN and graphite.

The overlay layer acts to enhance the conformability of an initial stage, in which In acts to enhance the corrosion resistance and Cu acts to enhance the strength of the Pb matrix.

According to the second aspect of the invention, there is provided a method of producing the copper-based, sintered sliding material, comprising the steps of: spreading a powder of Cu or a Cu alloy on a steel sheet; performing a primary sintering thereof; performing a primary rolling thereof; performing a secondary sintering thereof; performing a secondary rolling thereof with a rolling reduction not less than 10%; and performing a heating treatment thereof at a temperature not less than the recrystallization-commencement temperature of Cu or the Cu alloy but less than the recrystallization-commencement temperature of a steel back metal layer.

In the primary rolling, sintering pores present in the sintering layer is crushed to make the sintering layer compacted. In the state of the primary sintering, the sintering layer has pores not less than 30 volume %, which make the sintered layer brittle. Thus, in a case of performing the primary rolling at a large rolling reduction, there occurs such shortcomings as the sintered layer is cracked, as the sintered layer is apt to be peeled off from the steel back metal layer and as strain is afforded unevenly to the sintered layer. Thus, it is preferred that the primary rolling is performed not with a large rolling reduction but with such a rolling reduction as the pores are crushed to make the sintered layer compacted. The pore portions present in the sintered layer which are crushed during the primary rolling do not come to be integrated through metallic bond, however, the pore portions comes to be integrated through the metallic bond during the secondary sintering.

In the secondary rolling after the secondary sintering, the rolling reduction not less than 10% is adopted so that the whole thickness of the copper-based, sintered sliding material becomes about 90% or less of the thickness thereof before the secondary rolling (, that is, a thickness after the secondary sintering). Even in the case where the secondary rolling is performed with this large rolling reduction not less than 10%, there occurs no fear of the cracking of the sintered layer or of the peeling-off thereof from the steel back metal layer because the sintered layer is made to have such a compacted structure as the pores present in the sintered layer are minimized by the primary rolling. Since the secondary rolling is performed with the rolling reduction not less than 10% with respect to the compacted sintered layer with minimized pores, it becomes possible to perform the rolling while affording a uniform strain over the whole of the sintered layer. By this rolling, the sintered layer comes to have an amorphous structure in which the crystal grains are broken finely, as shown in FIG. 5, and strains come to be present in the grains of the sintered layer and in the grains of the steel back metal layer.

In this state, the heating treatment is performed under the temperature condition not less than the recrystallization-commencement temperature of Cu or the Cu alloy but less than the recrystallization-commencement temperature of the steel back metal layer. In this case, since each of the recrystallization-commencement temperature of Cu or the Cu alloy and the recrystallization-commencement temperature of the steel constituting the steel back metal layer varies in dependence on the amount of the strains present in the crystal grains (, that is, the value of the rolling reduction of the secondary rolling), the temperature of the heating treatment is selected appropriately in accordance with the degree of the strains.

Because of this heat treatment, the recrystallization occurs in the sintered layer. In the recrystallization of the sintered layer, new crystal grains regenerated therein become uniform, fine grains each having a size not more than 45 μm because the secondary rolling is performed with a large rolling reduction not less than 10% to thereby afford to the grains the uniform strains which become nuclei for the recrystallization and because the heating is performed at the temperature at which the grains of Cu or the Cu alloy hardly grow. The size of the grains is an arithmetic mean value calculated from the maximum grain size and minimum grain size of each of the grains.

In addition, the substantially uniform deformation is applied to the whole of the sintered layer through the secondary rolling performed after the secondary sintering, so that there does not occur such a fear as a part of the new crystal grains grows to become coarse grains due to the presence of locally small crystal strains. Thus, even in the case where the heating treatment is performed at a temperature somewhat exceeding the recrystallization-commencement temperature of Cu or the Cu alloy, or less than the recrystallization-commencement temperature of the steel back metal layer, the whole of the sintered layer comes to have a uniform, fine structure as shown in FIGS. 6 and 7.

Accordingly, by the heating treatment, Cu or the Cu alloy constituting the sintered layer is recrystallized, the strain therein being substantially completely released with Cu or the Cu alloy being softened, and the hardness thereof becomes not more than 130 Hv. However, since the new grains occurring by the recrystallization are fine in size, the sintered layer comes to have a high strength together with a high extensibility (workability).

On the other hand, since the heat treatment is performed at the temperature less than the recrystallization-commencement temperature of the steel back metal layer, no recrystallization occurs in the steel back metal layer. However, in the heat treatment, the recovery phenomenon occurs in the steel back metal layer, so that the crystal strains applied to the steel back metal layer by the secondary rolling is relieved. Since the relieving of the strains occurs not by the recrystallization thereof but by the recovery thereof, all of the strains are not released. Thus, the degree of decrease in the strength of the steel back metal layer, which has been worked to have a high strength by the secondary rolling, becomes small with the result that the steel back metal layer can keep a high hardness not less than 160 Hv and a high yield strength. Accordingly, when a half bearing or a cylindrical bearing made of the sliding material of the invention is attached onto a housing, no buckling of the bearing occurs even in a case of a large interference being adopted with respect to a bearing having a thin thickness or another bearing having a narrow width. Further, because of the relieving of the crystal strain, the thermal conductivity of the steel back metal layer becomes good, the elongation thereof becoming such a high level as to be not less than 10%, so that the extensibility (workability) thereof becomes good. Accordingly, there occurs no fear that the steel back metal layer is cracked during the press working.

Further, since the temperature of the heat treatment is made to be higher than that of the use of the bearing, the heat treatment acts to previously afford the recovery, which would occur during the use of the bearing if no heat treatment is performed, to the bearing. Thus, it becomes possible to prevent the variation (decrease) of the circumferential length of the bearing from being caused during the relieving of the strain due to the recovery phenomenon which occurs during the use of the bearing.

The time of the heating treatment is preferably 5 to 60 minutes. In a case of the time less than 5 minutes, both of the recovery phenomenon of the steel back metal layer and the recrystallization of the sintered layer become insufficient, however, in another case of the time exceeding 60 minutes, the crystal grains in the sintered layer become coarse in size, and this time makes the method unsuitable for the mass production using continuous sintering furnaces. In the production method of the invention, a further rolling applied to the material may be performed by use of rolls so as to adjust the dimensions of the sliding material after the heat treatment.

According to the third aspect of the invention, there is provided a sliding bearing adapted to be mounted in a housing, said bearing having, together with improved decrease in a circumferential length of said bearing, a superior resistance to buckling which is apt to occur when said sliding bearing is mounted in the housing with a large interference, said sliding bearing comprising a steel back metal layer, and a sintered layer made of Cu or a Cu-based alloy which is bonded onto the steel back metal layer, said steel back metal layer having a hardness not less than 160 Hv and an elongation not less than 10%, said sintered layer having a hardness not more than 130 Hv and crystal grains each provided with a grain size not more than 45 μm.

In the sliding bearing, the sintered layer may be made of a Cu-based alloy containing 1 to 11 mass % Sn, a first optional element of P not more than 0.2 mass %, at least one second optional element not more than 10 mass % in total selected from the group consisting of Ni and Ag, and at least one third optional element not more than 25 mass % in total selected from the group consisting of Pb and Bi.

In the sliding bearing, the sintered layer may further contain at least one kind not more than 15 vol. % in total selected from the group consisting of particles hard in hardness and particles of a high melting point substance and may contain a solid lubricant not more than 10 vol. % which is dispersed in the sintered layer.

The sliding material may comprise a plated overlay layer bonded onto the sintered layer, the overlay layer being made of a Pb—Sn alloy containing at least one selected from the group consisting of In and Cu.

DESCRIPTION OF THE PREFERRED EMBODIMENTS

The embodiments of the invention are described below.

Each of the copper-based, sintered sliding materials according to the embodiments of the invention was produced by the steps of performing the primary sintering, performing the primary rolling, performing the secondary sintering, performing the secondary rolling, and performing the heat treatment.

Figure 1:
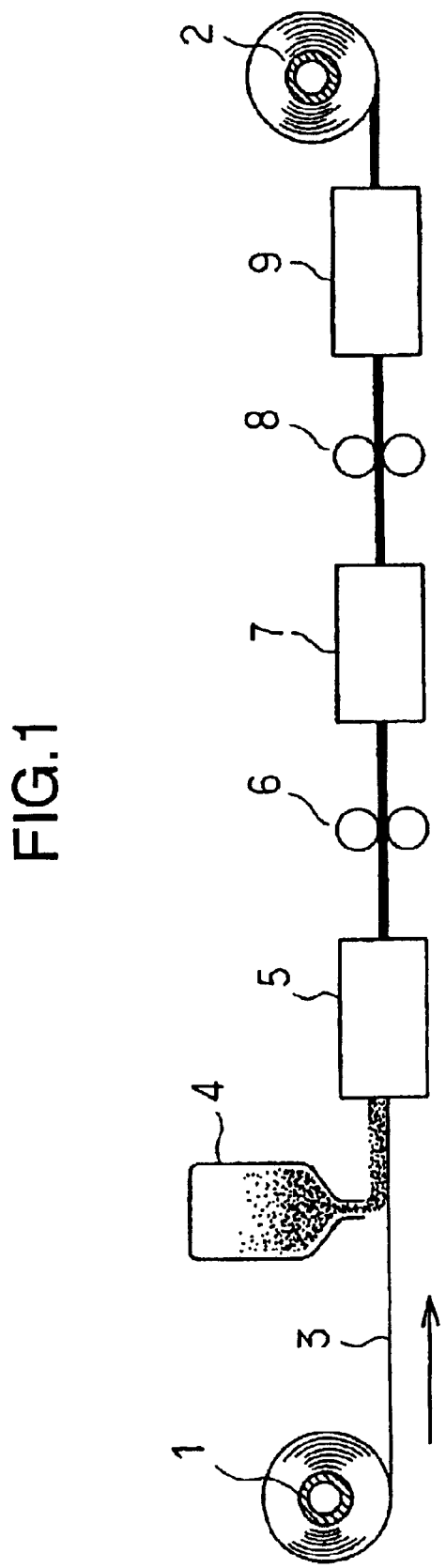
FIG. 1 is a drawing schematically showing one embodiment of the method of producing the sliding material according to the invention.

In FIG. 1 are schematically shown the production steps disclosed above. In the first stage of the production steps, there was installed an uncoiler 1, and an recoiler 2 was installed at the final stage of the production steps. On the uncoiler 1 was set a band steel 3 wound in a coil-shaped state. Between the uncoiler 1 and the recoiler 2, there were installed, when viewed in a direction from the uncoiler 1 to the recoiler 2, a powder-supplying and spreading tank 4, a primary sintering furnace 5, a roller apparatus 6 for the primary rolling, a secondary sintering furnace 7, another roller apparatus 8 for the secondary rolling and a heating treatment furnace 9.

Figure 2:
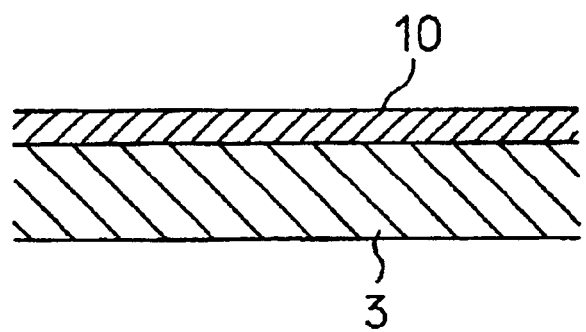
FIG. 2 is a partial sectional view of a copper-based, sintered sliding material of one embodiment of the invention.

The band steel 3 taken out from the uncoiler 1 was transferred toward the recoiler 2 through a transferring apparatus (not shown). On the band steel 3 taken out from the uncoiler 1, a powder of Cu or a Cu alloy was spread at a predetermined thickness through the powder-supplying and spreading tank 4, the spread powder being made to pass through the primary sintering furnace, so that the Cu or Cu alloy was sintered on the band steel 3 with a sintered layer 10 being bonded onto the band steel 3 as shown in FIG. 2. The sintering in the primary sintering furnace 5 was performed by heating in an reducing atmosphere at a temperature of 800 to 950° C. for about 15 minutes. In the embodiments, there were used a steel of JIS-SAE 1018 as the band steel 3 (which became the steel back metal layer after the finishing of the production steps), and a Cu-based alloy powder (as the spread powder) consisting essentially of 11 mass % Sn and the balance Cu which was produced through an atomizing method.

The band steel 3 regarding which the primary sintering was finished was subjected to the primary rolling through the roller apparatus 6 so that the compacting of the sintered layer 10 was performed, whereby a composite material (that is, the band steel 3 and the sintered layer 10 bonded onto the band steel 3) was prepared. After that, the composite material was made to pass through the secondary sintering furnace 7, so that the secondary sintering was performed under the same conditions as those in the primary sintering. After the finishing of the secondary sintering, the composite material was made to pass through the roller apparatus 8, so that the secondary rolling of the composite material was performed at a rolling reduction not less than 10%.

After the secondary rolling, the composite material was made to pass through the heating treatment furnace 9, in which the composite material was heated for a time of 5 to 60 minutes at a temperature not less than the recrystallization-commencement temperature of the sintered layer 10 but less than the recrystallization-commencement temperature of the band steel 3, that is, at a temperature range between the lower limit corresponding to the recrystallization-commencement temperature of the sintered layer 10 and the upper limit corresponding the temperature higher by 150° C. than the recrystallization temperature of this sintered layer 10, which specifically means 500 to 650° C. After passing through the heating treatment furnace 9, the composite material finished as the copper-based, sintered sliding material was coiled on the recoiler 2.

By use of each of the copper-based, sintered sliding materials thus produced, there was made a sliding bearing, and a comparative sliding bearing was also made by use of a conventional copper-based, sintered sliding material. In each of the sliding bearing relating to the invention and the comparative sliding bearing, the steel back metal layer thereof was made of a steel of JIS-SAE 1018, the sintered layer being made of the copper-based alloy consisting essentially of 11 mass % Sn and the balance copper. The result of the comparison between the sliding bearing made of the material according to the present invention and the comparative sliding bearing made of the conventional material is described below.

Figure 5:
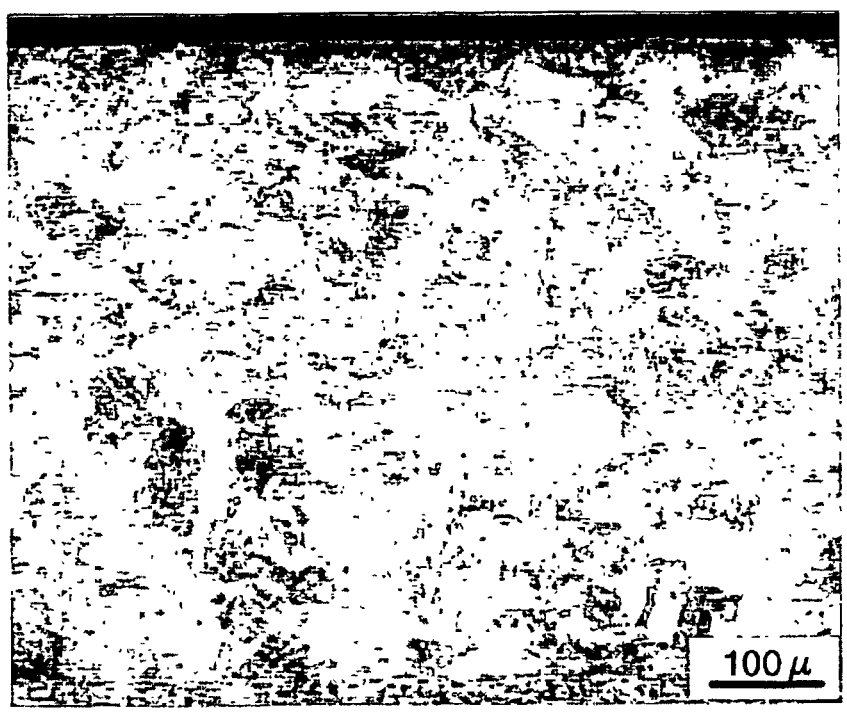
FIG. 5 is a photograph showing the structure of the sintered layer after the secondary rolling.
Figure 6:
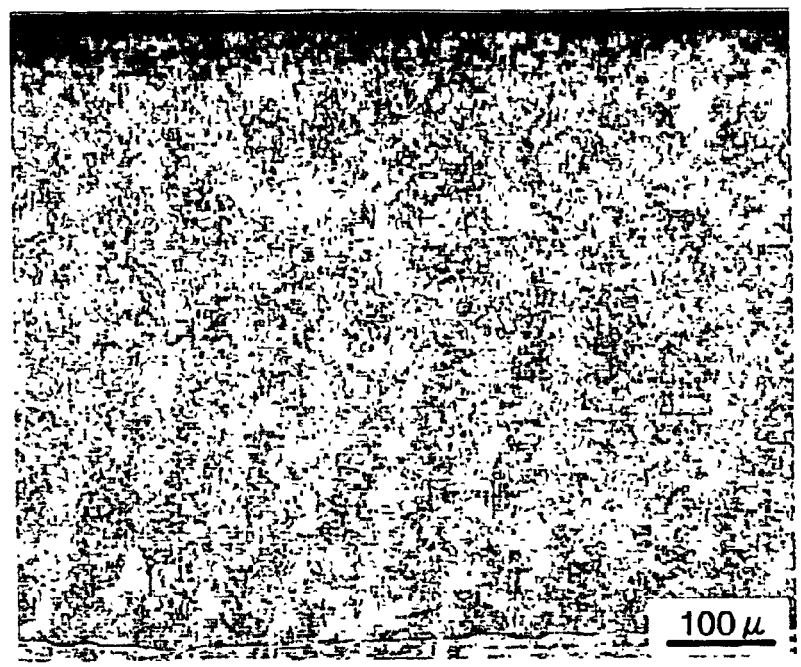
FIG. 6 is a photograph showing the structure of the sintered layer after the heat treatment performed at 500° C.
Figure 7:
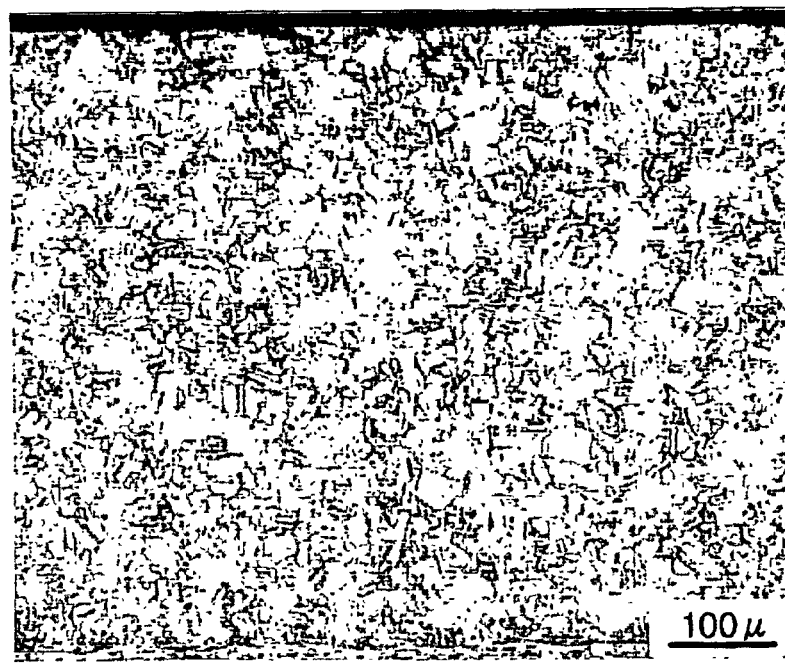
FIG. 7 is a photograph showing the structure of the sintered layer after the heat treatment performed at 650° C.

FIG. 5 shows the Cu-based alloy structure of the sintered layer which becomes amorphous due to the secondary rolling relating to the invention, FIG. 6 showing the Cu-based alloy structure of the sintered layer subjected, after the secondary rolling, to the heating treatment at 500° C. which is somewhat higher than the recrystallization commencement temperature of the Cu or Cu-based alloy which is the lowermost temperature of the heating treatment relating to the invention, and FIG. 7 shows the Cu-based alloy structure of the sintered layer subjected to the heating treatment at 650° C. which is the uppermost temperature of the heat treatment relating to the invention. On the other hand, FIGS. 8 and 9 show the Cu-based alloy structures subjected, after the secondary rolling, to the heat treatment at 700° C. and 800° C. which are more than the recrystallization-commencement temperature of the steel back metal layer, that is, which are outside of the heat treatment temperature range relating to the invention, respectively.

Figure 8:
FIG. 8 is a photograph showing the structure of the sintered layer after the heat treatment performed at 700° C.
Figure 9:
FIG. 9 is a photograph showing the structure of the sintered layer after the heat treatment performed at 800° C.

As apparent from comparing FIGS. 6 and 7 with FIGS. 8 and 9, the copper-based alloy structure of the copper-based, sintered sliding material of the invention is fine in size, and the size of the grains of the Cu-based alloy becomes not more than 45 µm.

Figure 3:
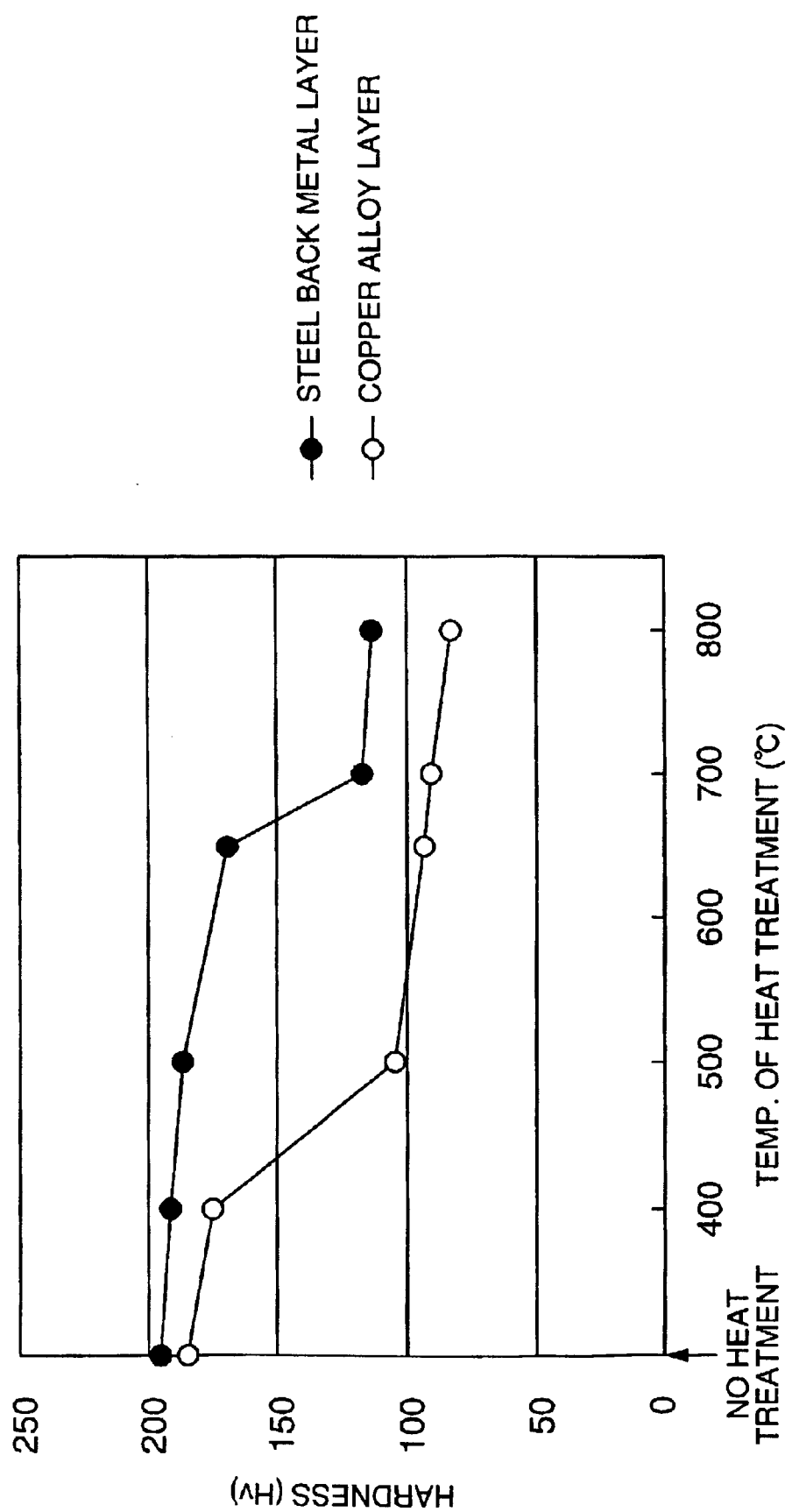
FIG. 3 is a graph showing the results of a hardness test of the sliding materials produced while making the temperature of the heat treatment varied variously.
Figure 4:
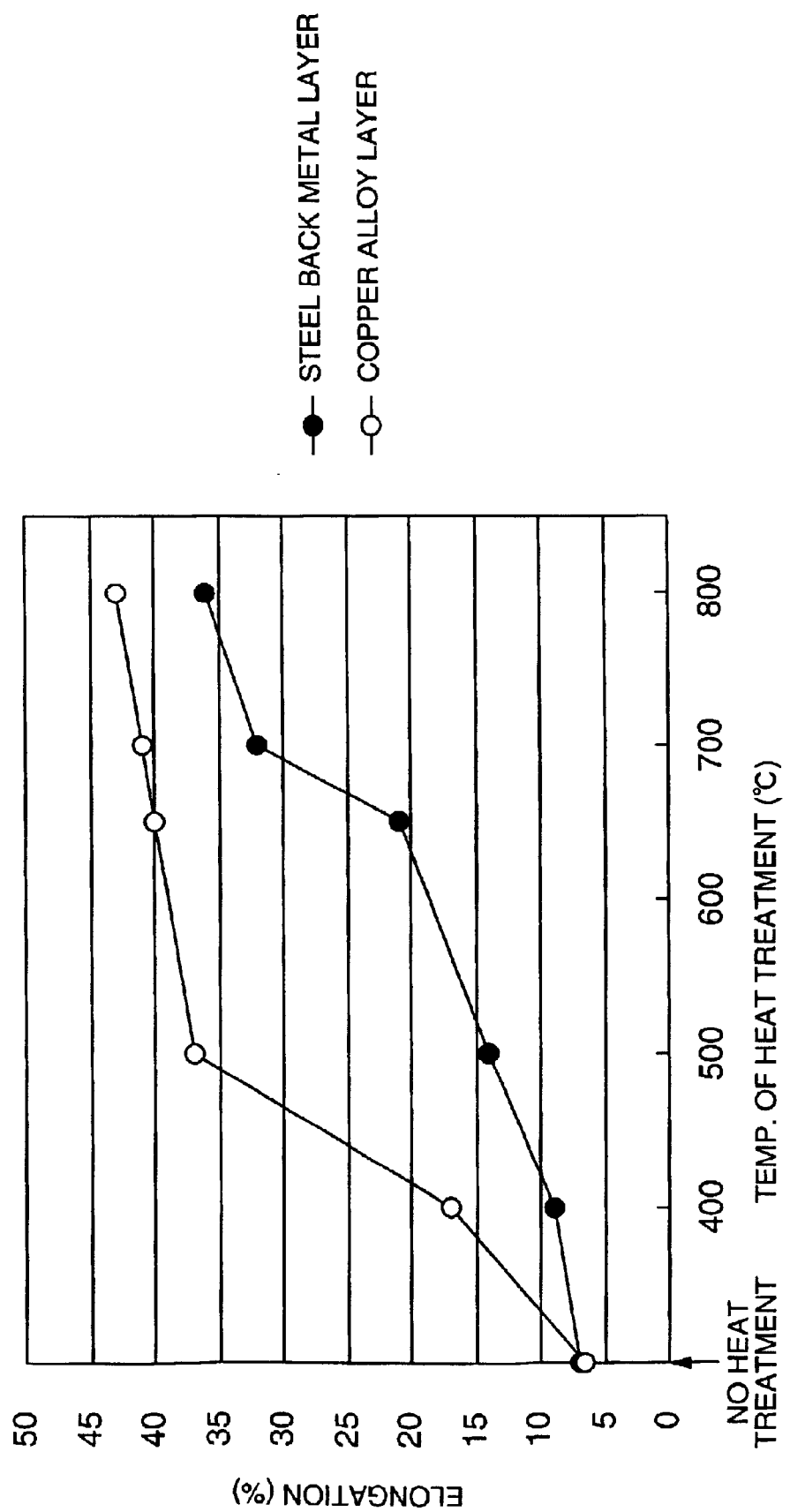
FIG. 4 is a graph showing the results of an elongation test of the sliding materials produced while making the temperature of the heat treatment varied variously.

FIGS. 3 and 4 are graphs showing the variation of the hardness and elongation of the Cu-based, sintered sliding materials produced at various temperatures with respect to the heat treatment performed after the secondary rolling, respectively. According to FIGS. 3 and 4, it is apparent that, in each of the Cu-based, sintered sliding materials subjected to the heat treatment at a temperature between 500° C. and 650° C., the steel back metal layer has a hardness not less than 160 Hv and an elongation not less than 10% with the sintered layer having the hardness not more than 130 Hv and the elongation not less than 30%. On the other hand, in the sliding materials subjected to no heat treatment or subjected to the heat treatment at 400° C., the hardness of the sintered layer becomes so high that the conformability and embeddability thereof become poor. Further, in each of the sliding materials subjected to the heat treatment at temperatures of 700° C. and 800° C., the steel back metal becomes so softened that the yield point thereof is too lowered unfavorably.

The characteristics of the copper-based, sintered sliding materials of the invention were compared with those of the comparative sliding materials. Namely, regarding each of the products according to the embodiments of the invention and each of the comparative products all produced under the conditions shown in Table 1, the hardness and elongation of the steel back metal layer, the hardness and the grain size of the sintered layer, the yield point in the circumferential direction of each of bearings made of the sliding materials, and the decrease in the circumferential length of each of the bearings made of the sliding materials were measured, the results of the measurement being shown at the right-hand side of Table 1. In each of the products of the embodiments of the invention and the comparative products, the steel back metal layer was made of the material of JIS-SAE 1018, the sintered layer being made of the Cu-based alloy shown in Table 1, the thickness of the steel back metal layer of the finished sliding bearing being 1.25 mm, and the thickness of the sintered layer of the finished sliding bearing was 0.55 mm.

The yield point in the circumferential direction was measured by a method comprising the steps of: working the copper-based, sintered sliding material into a half bearing having a gauge diameter of 51 mm and a width of 13 mm; mounting the half bearing in a bearing-height-measuring device defined in JIS-D3102; successively increasing a load applied onto the half bearing so that the stress in the circumferential direction of the bearing was raised stepwise by 10 MPa from 2.97 KN which was the standard load for measuring the circumferential length of the bearing; and detecting a stress just before the commencement of the plastic deformation thereof, this stress being decided to be the yield point in the circumferential direction.

The decrease in the circumferential length was measured by the steps of: working each of the copper-based, sintered sliding materials into a half bearing having a gauge diameter of 51 mm and a width of 13 mm; mounting the half bearing in the actual connecting rod for an internal combustion engine so that a stress in the circumferential direction of 500 MPa was caused; and measuring both of a first length in the circumferential direction of the half bearing before it was mounted in the connecting rod and a second length in the circumferential direction thereof after 2 hours elapsed at 200° C. while the mounting of the half bearing in the connecting rod, a difference between the first and second lengths being decided to be the decrease in circumferential length.

TABLE 1

| | composition | | | | | | | | | rolling | heat treatment |
| | mass % | | | | | | | | volume % | reduction | temperature |
| No. | Cu | Sn | P | Ni | Ag | Pb | Bi | Mo | Gr | % | ° C. |
| | | | | Inventive products | | | | | | | |
| 1 | the balance | 1 | | | | | | | | | 670 |
| 2 | the balance | 5 | | | | | | | | 10 | 600 |
| 3 | the balance | 5 | | | | | | | | 15 | 600 |
| 4 | the balance | 11 | | | | | | | | 15 | 550 |
| 5 | the balance | 5 | 0.2 | 5 | 5 | | | | | 15 | 580 |
| 6 | the balance | 5 | | | | | | 1 | 0.5 | 15 | 600 |
| 7 | the balance | 5 | | | | 15 | | | | 15 | 550 |
| 8 | the balance | 5 | | | | | 15 | | | 15 | 550 |
| | | | | Comparative product | | | | | | | |
| 1 | the balance | 1 | | | | | | | | 15 | none |
| 2 | the balance | 5 | | | | | | | | 10 | none |
| 3 | the balance | 5 | | | | | | | | 15 | none |
| 4 | the balance | 11 | | | | | | | | 15 | none |
| 5 | the balance | 1 | | | | | | | | 0 | none |
| 6 | the balance | 5 | | | | | | | | 0 | none |
| 7 | the balance | 11 | | | | | | | | 0 | none |
| 8 | the balance | 5 | | | | | | | | 15 | 300 |
| 9 | the balance | 5 | | | | | | | | 15 | 750 |

| | properties of the sintered layer | | properties of the steel back metal layer | | yield point in the circumference direction MPa | amount of decrease in the circumferential length μm |
| No. | hardness Hv | size of the grains μm | hardness Hv | elongation % | | |
| | | | Inventive products | | | |
| 1 | 69 | 40 | 190 | 18.3 | 610 | 2.4 |
| 2 | 83 | 8 | 168 | 16.9 | 580 | 3.2 |
| 3 | 84 | 10 | 188 | 17.1 | 595 | 2.8 |
| 4 | 100 | 10 | 187 | 14.1 | 595 | 2.5 |
| 5 | 97 | 5 | 189 | 16.8 | 600 | 1.9 |

TABLE 1-continued

| 6 | 84 | 10 | 190 | 14.9 | 600 | 2.7 |
|---|---|---|---|---|---|---|
| 7 | 77 | 20 | 186 | 13.4 | 595 | 3.0 |
| 8 | 74 | 25 | 190 | 12.9 | 605 | 2.4 |
| Comparative products | | | | | | |
| 1 | 109 | — | 195 | 6.3 | 615 | 24.4 |
| 2 | 125 | — | 173 | 7.2 | 585 | 21.3 |
| 3 | 142 | — | 192 | 6.0 | 600 | 23.4 |
| 4 | 168 | — | 197 | 5.8 | 620 | 23.7 |
| 5 | 66 | 80 | 112 | 34.8 | 450 | 12.2 |
| 6 | 81 | 55 | 109 | 33.7 | 445 | 13.4 |
| 7 | 98 | 70 | 111 | 35.6 | 450 | 13.3 |
| 8 | 133 | — | 193 | 8.6 | 620 | 8.4 |
| 9 | 74 | 60 | 110 | 37.8 | 450 | 14.3 |

The half bearing products Nos. 1 to 4 according to the embodiments of the invention were compared with the comparative half bearing products Nos. 1 to 4 each of which was not subjected to any heat treatment although each pair of the inventive products and the comparative product (, that is, the first pair of the inventive product No. 1 and the comparative product No. 1, the second pair of the inventive product No. 2 and the comparative product No. 2, and so forth) had the same composition regarding each of the layers and the same rolling reduction regarding the secondary rolling. In each of the inventive products Nos. 1 to 4, the Cu-based alloy of the sintered layer is, as apparent from Table 1, soft, and the steel back metal layer has the high strength and the high yield point and reveals the high elongation. However, in each of the comparative products, the steel back metal layer has the low elongation although it has the high strength, and the sintered layer is hard in hardness. Further, although the strength of the steel back metal layer in each of the inventive products is equivalent to that of each of the comparative products, the decrease in the circumferential length of the half bearing regarding each of the comparative products Nos. 1 to 4 becomes large due to the relieving of the strains in the grains, which occurs during the recovery.

Further, in comparing the inventive products Nos. 1 to 4 with the comparative products Nos. 5 to 7 each of which was subjected to neither secondary rolling nor heat treatment although they have the same compositions as those of the inventive products, each of the comparative products has the steel back metal layer of the low strength and the low yield point although each of them has the sintered layer soft in hardness, so that each of the comparative products can not withstand the stress occurring during the mounting thereof in the connecting rod with the result that the decrease in the circumferential length of each of the comparative bearing products becomes large.

In the comparative product No. 8 which was made by use of the Cu-based, sintered sliding material having the same composition as that of the inventive product No. 3 and which was made with the same rolling reduction as that of the inventive product No. 3 although the heating treatment was performed at 300° C. which is less than the recrystallization-commencement temperature of the Cu-based alloy, the sintered layer is hard in hardness, and the recovery phenomenon of the steel back metal layer becomes insufficient due to the low temperature of the heat treatment, so that the elongation of the steel back metal layer is low with the decrease in the circumferential length being large in comparison with the inventive product No. 3.

In the comparative product No. 9 which was made by use of a sliding material having the same composition as that of the inventive product No. 3 and at the same rolling reduction as that of the inventive product No. 3 although the heating treatment was performed at 750° C. which is not less than the recrystallization-commencement temperature of the steel back metal layer, the strength and the yield point thereof are low due to the recrystallization of the steel back metal layer, so that the comparative product No. 9 was not able to withstand the stress caused during the mounting thereof in the connecting rod, and the decrease in the circumferential length becomes large.

Further, in each of the inventive product No. 5 having the sintered layer containing P for enhancing the strength thereof and Ni and Ag for enhancing both of the strength and corrosion resistance thereof, the inventive product No. 6 having the sintered layer containing Mo and graphite (Gr) for enhancing each of the wear resistance, the anti-seizure property and the lubrication property, and the inventive products Nos. 7 and 8 each of which has the sintered layer containing Pb and Bi for enhancing the anti-seizure property, it becomes clear that each of these inventive bearing products comes to have, by being subjected to the heat treatment within the limited temperature range, the sintered layer soft in hardness, the steel back metal layer high in strength, the high yield point, the high elongation, and the small decrease in the circumferential length.

What is claimed is:

1. A copper-based sintered sliding material comprising a steel back metal layer, and a sintered layer made of Cu or a Cu-based alloy which is bonded onto the steel back metal layer, said steel back metal layer having a hardness not less than 160 Hv and an elongation not less than 10%, said sintered layer having a hardness not more than 130 Hv and crystal grains each provided with a grain size not more than 45 μm.

2. A copper-based sintered sliding material according to claim 1, wherein said sintered layer is made of a Cu-based alloy containing 1 to 11 mass % Sn, a first optional element of P not more than 0.2 mass %, at least one second optional element not more than 10 mass % in total selected from the group consisting of Ni and Ag, and at least one third optional element not more than 25 mass % in total selected from the group consisting of Pb and Bi.

3. A copper-based sintered sliding material according to claim 2, wherein said sintered layer contains at least one kind not more than 15 vol. % in total selected from the group consisting of particles hard in hardness and particles of a high melting point substance.

4. A copper-based sintered sliding material according to claim 3, wherein said sintered layer contains a solid lubricant not more than 10 vol. % which is dispersed in the sintered layer.

5. A method of producing a copper-based sintered sliding material according to claim 4, comprising the steps of:
preparing a steel sheet;
spreading a powder of Cu or the Cu-based alloy;
performing a primary sintering of said powder spread on the steel sheet to thereby prepare a sintered material;
performing a primary rolling at said sintered material;
performing a second sintering at said rolled material;
performing a second rolling of said second-sintered material with a rolling reduction not less than 10%; and
heat-treating the material at a temperature not less than the recrystallization-commencement temperature of Cu or said Cu-based alloy but less than the recrystallization-commencement temperature of said steel sheet.

6. A method of producing a copper-based, sintered sliding material according to claim 3, comprising the steps of:
preparing a steel sheet;
spreading a powder of Cu or the Cu-based alloy;
performing a primary sintering of said powder spread on the steel sheet to thereby prepare a sintered material;
performing a primary rolling of said sintered material;
performing a second sintering of said rolled material;
performing a second rolling of said second-sintered material with a rolling reduction not less than 10%; and
heat-treating the material at a temperature not less than the recrystallization-commencement temperature of Cu or said Cu-based alloy but less than the recrystallization-commencement temperature of said steel sheet.

7. A copper-based sintered sliding material according to claim 2, wherein in said sintered layer contains a solid lubricant not more than 10 vol. % which is dispersed in the sintered layer.

8. A method of producing a copper-based, sintered sliding material according to claim 7, comprising the steps of:
preparing a steel sheet;
spreading a powder of Cu or the Cu-based alloy;
performing a primary sintering of said powder spread on the steel sheet to thereby prepare a sintered material;
performing a primary rolling of said sintered material;
performing a second sintering of said rolled material;
performing a second rolling of said second-sintered material with a rolling reduction not less than 10%; and
heat-treating the material at a temperature not less than the recrystallization-commencement temperature of Cu or said Cu-based alloy but less than the recrystallization-commencement temperature of said steel sheet.

9. A method of producing a copper-based, sintered sliding material according to claim 2, comprising the steps of:
preparing a steel sheet;
spreading a powder of Cu or the Cu-based alloy;
performing a primary sintering of said powder spread on the steel sheet to thereby prepare a sintered material;
performing a primary rolling of said sintered material;
performing a second sintering of said rolled material;
performing a second rolling of said second-sintered material with a rolling reduction not less than 10%; and
heat-treating the material at a temperature not less than the recrystallization commencement temperature of Cu or said Cu-based alloy but less than the recrystallization commencement temperature of said steel sheet.

10. A copper-based sintered sliding material according to claim 2, further comprising a plated overlay layer bonded onto the sintered layer, said overlay layer being made of a Pb—Sn alloy containing at least one selected from the group consisting of In and Cu.

11. A copper-based sintered sliding material according to claim 1, wherein said sintered layer contains at least one kind not more than 15 vol. % in total selected from the group consisting of particles hard in hardness and particles of a high melting point substance.

12. A copper-based sintered sliding material according to claim 11, wherein said sintered layer contains a solid lubricant not more than 10 vol. % which is dispersed in the sintered layer.

13. A method of producing a copper-based, sintered sliding material according to claim 12, comprising the steps of:
preparing a steel sheet;
spreading a powder of Cu or the alloy;
performing a primary sintering of said powder spread on the steel sheet to thereby prepare a sintered material;
performing a primary rolling of said sintered material;
performing a second sintering of said rolled material;
performing a second rolling of said second-sintered material with a rolling reduction not less than 10%; and
heat-treating the material at a temperature not less than the recrystallization-commencement temperature of Cu or said Cu-base alloy but less than the recrystallization-commencement temperature of said steel sheet.

14. A method of producing a copper-based, sintered sliding material according to claim 11, comprising the steps of:
preparing a steel sheet;
spreading a powder of Cu or the Cu-based alloy;
performing a primary sintering of said powder spread on the steel sheet to thereby prepare a sintered material;
performing a primary rolling of said sintered material;
performing a second sintering of said rolled material;
performing a second rolling of said second-sintered material with a rolling reduction not less than 10%; and
heat-treating the material at a temperature not less than the recrystallization-commencement temperature of Cu or said Cu-based alloy but less than the recrystallization-commencement temperature of said steel sheet.

15. A copper-based sintered sliding material according to claim 11, further comprising a plated overlay layer bonded onto the sintered layer, said overlay layer being made of a Pb—Sn alloy containing at least one selected from the group consisting of In and Cu.

16. A copper-based sintered sliding material according to claim 1, wherein said sintered layer contains a solid lubricant not more than 10 vol. % which is dispersed in the sintered layer.

17. A method of producing a copper-based, sintered sliding material according to claim 16, comprising the steps of:
preparing a steel sheet;
spreading a powder of Cu or the Cu-based alloy;
performing a primary sintering of said powder spread on the steel sheet to thereby prepare a sintered material;
performing a primary rolling of said sintered material;
performing a second sintering of said rolled material;

performing a second rolling of said second-sintered material with a rolling reduction not less than 10%; and heat-treating the material at a temperature not less than the recrystallization-commencement temperature of Cu or said Cu-based alloy but less than the recrystallization-commencement temperature of said steel sheet.

18. A copper-based sintered sliding material according to claim 16, further comprising a plated overlay layer bonded onto the sintered layer, said overlay layer being made of a Pb—Sn alloy containing at least one selected from the group consisting of In and Cu.

19. A copper-based sintered sliding material according claim 1, further comprising a plated overlay layer bonded onto the sintered layer, said overlay layer being made of a Pb—Sn alloy containing at least one selected from the group consisting of In and Cu.

20. A method of producing a copper-based, sintered sliding material according to claim 1, comprising the steps of:

preparing a steel sheet;

spreading a powder of Cu or the Cu-based alloy;

performing a primary sintering of said powder spread on the steel sheet to thereby prepare a sintered material;

performing a primary rolling of said sintered material;

performing a second sintering of said rolled material;

performing a second rolling of said second-sintered material with a rolling reduction not less than 10%; and heat-treating the material at a temperature not less than the recrystallization-commencement temperature of Cu or said Cu-based alloy but less than the recrystallization commencement temperature of said steel sheet.

* * * * *